UNITED STATES PATENT OFFICE.

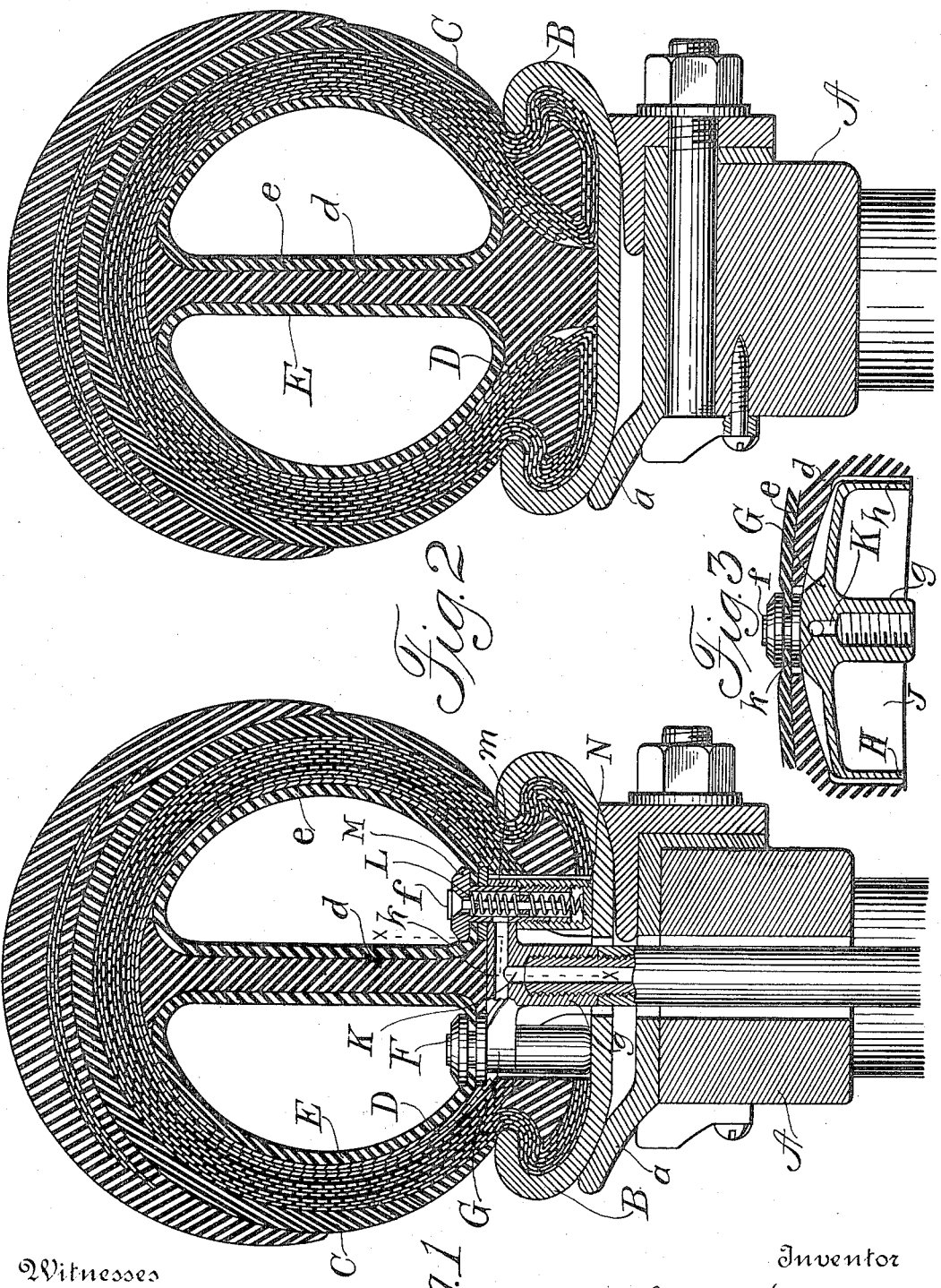

JOHN WM. MOAKLER, OF EAST WORCESTER, NEW YORK, ASSIGNOR OF ONE-HALF TO NOAH S. WRIGHT, OF EAST WORCESTER, NEW YORK.

PNEUMATIC TIRE.

1,160,310.  Specification of Letters Patent.  Patented Nov. 16, 1915.

Application filed September 11, 1914. Serial No. 861,252.

*To all whom it may concern:*

Be it known that I, JOHN W. MOAKLER, a citizen of the United States, residing at East Worcester, in the county of Otsego and State of New York, have invented certain new and useful Improvements in Pneumatic Tires, of which the following is a specification.

This invention relates to pneumatic tires usually made of rubber or rubber fabrics and compositions, and intended for use on automobile wheels, but which may be employed as well on bicycles and other vehicles without material change of construction.

This invention consists in the production of a tire, the outward construction of which may be of any selected character or design, comprising a radial, annular web, usually elastic and compressible, arranged in the middle of the tire, and extending from the inside of the tread of the tire to the wheel rim upon which the web immediately bears as this invention is ordinarily constructed.

The object of this invention is to interpose an additional support in an inflated tire, directly between the tread of the tire and the wheel rim where the greater portion of the machine and load weight is taken up.

It is also an object of this invention to provide parts of special arrangement and construction for accomplishing the purpose, including twin, inflated inner tubes acting to support the web at the sides, and to maintain the distension of the tire in the customary manner, whereby it is believed unusual durability is achieved and that less frequent pumping up of the tire is called for.

The construction of the parts and their arrangement are set out in the accompanying drawings, of which—

Figure 1 represents a tire to which this invention is applied, and shows a cross-section of all the parts assembled. The section is taken at the point where the valves for the inner tubes are located. Fig. 2 is a cross-section of the tire at any other point. Fig. 3 is a section lengthwise of the valvular devices, and of the recess in the web which those devices occupy. The section is indicated by the indirect broken line *x—x* of Fig. 1.

Throughout the drawings and description the same letter refers to the same part.

Considering the drawings, the wheel A has a metal face *a* upon which is a demountable wheel rim B engaging a tire C.

The lining D for the interior of the tire consists of three layers of tire fabric, as this invention is ordinarily constructed, vulcanized and shaped to fit the tire, and the lining may or may not be caused to adhere to the outer periphery of the annular, rubber web *d*. The lower part of the web *d* is widened and extends beneath and partly supports the inner tubes.

The twin inflated inner tubes E and *e* are arranged between the sides of the web and the interior of the lining. To admit compressed air to the tubes, check valve F and *f* are provided. Those valves are connected together by a body or bridge portion G, provided with a middle air connection *g*, and having at its ends the legs H and *h*, as best shown in Fig. 3. The legs usually extend to the lower surface of the web *d*, or, more clearly, to that surface of the web resting immediately against the wheel rim B. A suitable recess J is formed in the web to receive the valvular devices, and by way of the ducts K and *k* air passes to the valves and to the inner tubes. Each of the valves is yieldingly seated by means of a spring L, and the casing of the valve has a head M. When the head M and the end *m* of the body G of the valve support are clamped together by means of the screw cap N, an airtight joint is made with a portion of the inner tube engaged as illustrated.

It will be noted that the screw cap N and its fellow rest against the wheel rim B, and that the legs H and *h* of the body G extend to the mouth of the recess J in the web *d*, in other words, the legs also extend to the rim B. As the wheel revolves those parts are simply pressed against the rim, and they are not displaced or distorted in any manner.

To operate this invention, it is necessary to introduce the inner tubes. It will be observed that the bottom, or that portion of the lining D toward the center of the wheel, as best shown in Fig. 2, is open, and the tubes may be readily placed in position between the sides of the web and the lining D, and the valvular devices arranged in the recess J of the web provided for them. In fact, the web and lining afford in practice a very convenient means for introducing the inner tubes in the tire. The web additionally supports the tread of the tire directly, and receives for itself the lateral support of the inflated inner tube.

Having now described this invention and explained the nature of its operation, what I claim is:—

1. In a pneumatic tire, the combination with a wheel rim, of a casing, inner tubes arranged side by side within the said casing, and means for admitting air into the said tubes comprising tubular portions communicating with the tubes, and a bridge connected with and carrying the said tubular portions, the said bridge having legs constructed and arranged to stand upon the said rim and to support the said bridge.

2. In a pneumatic tire, the combination with a casing, of twin inner tubes arranged side by side within the casing, the said casing having a middle web located between the said tubes and having a portion extending below the tubes and provided with a recess, and means for admitting air into the tubes comprising tubular portions communicating with the tubes and a bridge located in the recess of the said web and having legs at its ends, the said tubular portions being mounted upon the said bridge.

In testimony whereof I affix my signature in presence of two witnesses.

JOHN WM. MOAKLER.

Witnesses:
  Louis Dante,
  M. Ross Hartwell.